United States Patent [19]
Rone

[11] Patent Number: 5,410,950
[45] Date of Patent: May 2, 1995

[54] ADJUSTABLE ROTISSERIE

[76] Inventor: Wilbur Rone, 212 Rock Hill Rd., Asheville, N.C. 28803

[21] Appl. No.: 67,668

[22] Filed: May 26, 1993

[51] Int. Cl.⁶ .......................................... A47J 37/04
[52] U.S. Cl. ........................... 99/421 HV; 126/41 B; 126/25 AA
[58] Field of Search ............ 99/419, 421 HV, 421 H, 99/393; 126/25 AA, 41 A, 41 B, 338

[56] References Cited
U.S. PATENT DOCUMENTS

| | | | |
|---|---|---|---|
| 2,386,815 | 10/1945 | Rubenstein | 99/421 HV |
| 2,715,870 | 8/1955 | Rutkowski | 99/421 HV |
| 2,729,160 | 1/1956 | Pirz | 99/421 HV |
| 3,085,497 | 4/1963 | Statia, Sr. | 99/340 |
| 4,043,260 | 8/1977 | La Pour et al. | 99/421 HV |
| 4,181,074 | 1/1980 | Hieb | 99/421 HV |
| 4,462,306 | 7/1984 | Eisendrath | 99/421 HV |
| 4,469,019 | 9/1984 | Baer | 99/421 HV |
| 4,541,406 | 9/1985 | DaSambiagio | 99/421 HV |
| 5,140,896 | 8/1992 | Duran | 99/421 HV |

Primary Examiner—David A. Scherbel
Assistant Examiner—Reginald L. Alexander
Attorney, Agent, or Firm—Carter & Schnedler

[57] ABSTRACT

There is provided an adjustable rotisserie having a fire bowl containing a heat source. An elongated rotatable shaft including a pair of prongs attached thereto for holding the food to be cooked is located above the fire bowl. A frame assembly which may be continuously raised and lowered contacts the shaft. The frame assembly, and thus the food, is raised and lowered by a jack which contacts the frame assembly. A motor is attached to the frame assembly for rotating the shaft so that the shaft may be continuously raised and lowered with respect to the fire bowl while the shaft is continuously rotated.

7 Claims, 2 Drawing Sheets

ADJUSTABLE ROTISSERIE

BACKGROUND OF THE INVENTION

This invention relates to outdoor cooking apparatus such as barbecue grills and the like. More particularly, it relates to barbecue grills which utilize rotisseries for cooking food.

Outdoor barbecuing has become more and more popular over the years. Often outdoor barbecue grills include a rotisserie attachment. The rotisserie attachment includes an elongated rotatable shaft with four prongs connected to the shaft for securing the meat or other food which is to be cooked.

By cooking with a rotisserie the food may be cooked more evenly than if cooking directly on a grill where it is up to the user to turn the food at the appropriate times. The rotisserie, on the other hand, permits one to more easily rotate the food and if a motor is attached to the rotisserie, the rotisserie will automatically turn the food, which reduces the margin of cooking error.

One of the problems, however, in cooking with a rotisserie is determining the correct distance above the fire bowl for the food to be located, that is, the correct height for the rotating shaft. This is particularly a problem when using charcoal because as the charcoal is consumed, the heat is reduced and thus there is a need to lower the rotisserie. On the other hand, if there is a large amount of charcoal in the fire bowl, the rotisserie should be higher.

There are a number of rotisserie grills on the market which permit the user to place the rotating shaft at predetermined, discreet levels with respect to the fire bowl. However, the electric motor, which drives the rotating shaft, must be turned off when the shaft is moved between the levels. In addition, the levels are discreet levels and thus the desired cooking temperatures might not be attained. One example of such a prior art grill is shown in U.S. Pat. No. 4,469,019 issued to Baer.

Thus there is a need to provide a rotisserie which overcomes these problems.

OBJECTS OF THE INVENTION

It is therefore one object of this invention to provide an improved adjustable rotisserie assembly.

It is another object to provide a barbecue grill which includes a rotisserie which may be adjusted in height over a wide range while continuously operating the rotisserie.

It is another object to provide an improved adjustable rotisserie which may be adjusted in height without disrupting the cooking operation.

SUMMARY OF THE INVENTION

In accordance with one form of this invention there is provided an adjustable rotisserie assembly including a fire bowl for containing a heat source. The assembly includes an elongated rotatable shaft. At least one prong is attached to the shaft for holding the food to be cooked. A frame is provided which contacts the shaft. A mechanism is provided for raising and lowering the frame and thus the shaft. A mechanism is further provided for rotating the shaft and is attached to the frame so that the shaft may be raised and lowered with respect to the fire bowl while the shaft is continuously rotating.

Preferably, the mechanism for raising and lowering the frame includes a jack which is connected to a handle through a gearing mechanism. The jack enables the food to be placed at any level in its range with respect to the fire bowl and thus the cooking temperature of the food may be precisely regulated. Thus a novel apparatus is provided for raising and lowering the food on a rotisserie while the rotisserie is continuously rotating without the need to stop the cooking process.

BRIEF DESCRIPTION OF THE DRAWINGS

The subject matter which is regarded as the invention is set forth in the appended claims. The invention itself, however, together with further objects and advantages thereof, may be better understood by reference to the following description taken in conjunction with the accompanying drawings in which:

DESCRIPTION OF THE PREFERRED EMBODIMENTS

Figure 1:
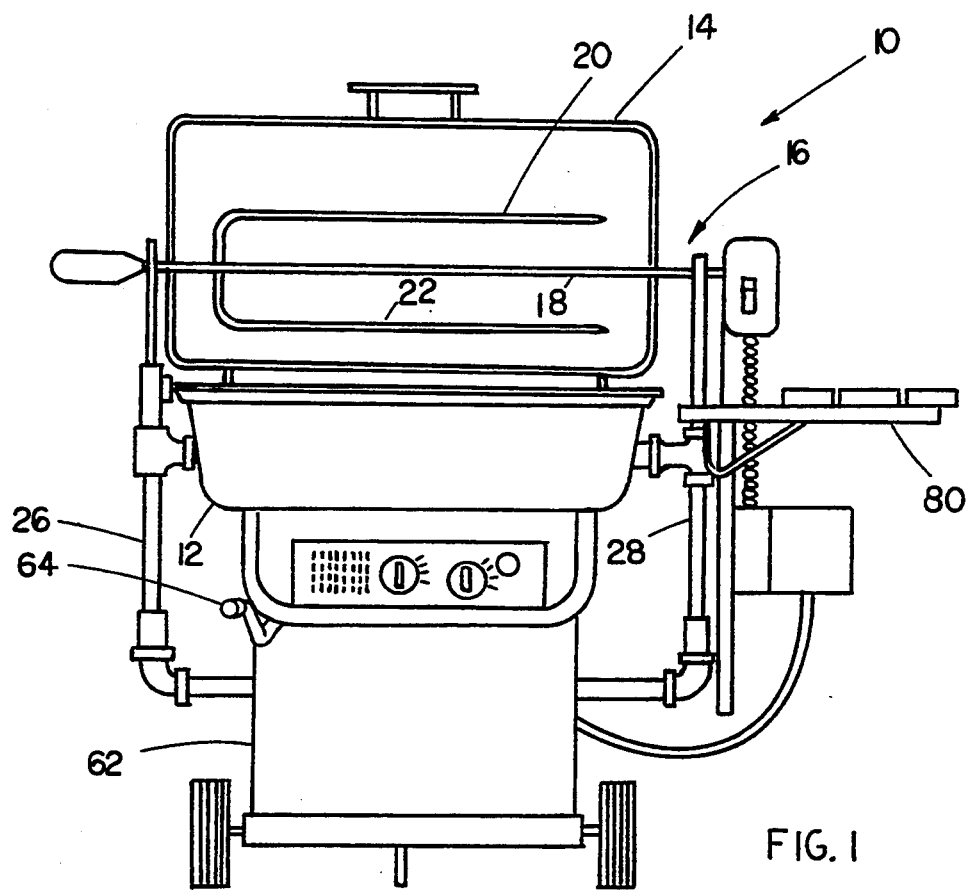
FIG. 1 is a front elevational view of the apparatus of the subject invention.
Figure 2:
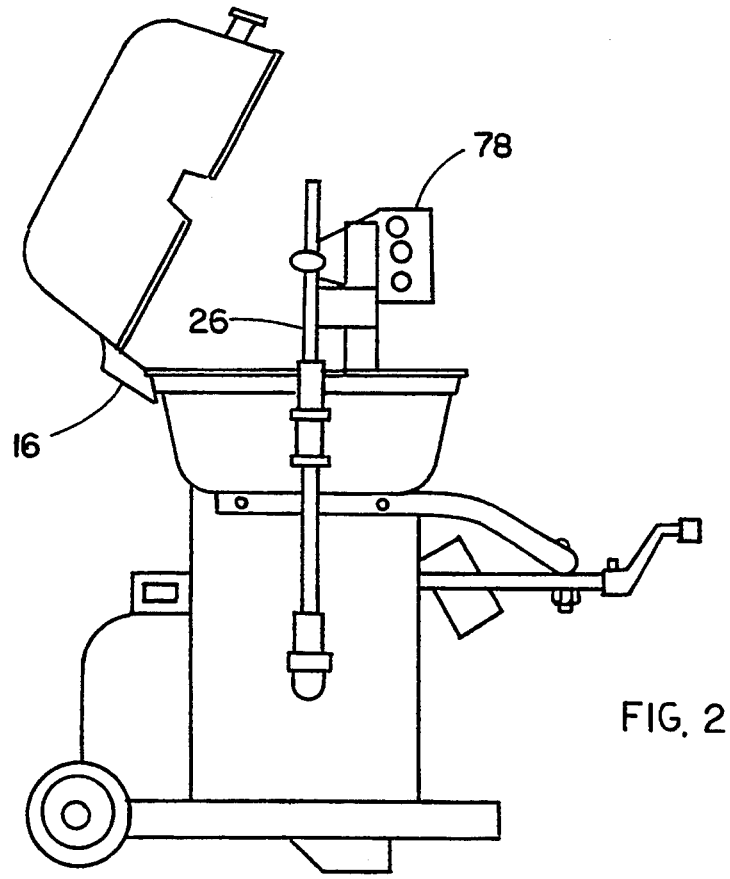
FIG. 2 is a left side elevational view of the apparatus of FIG. 1.
Figure 3:
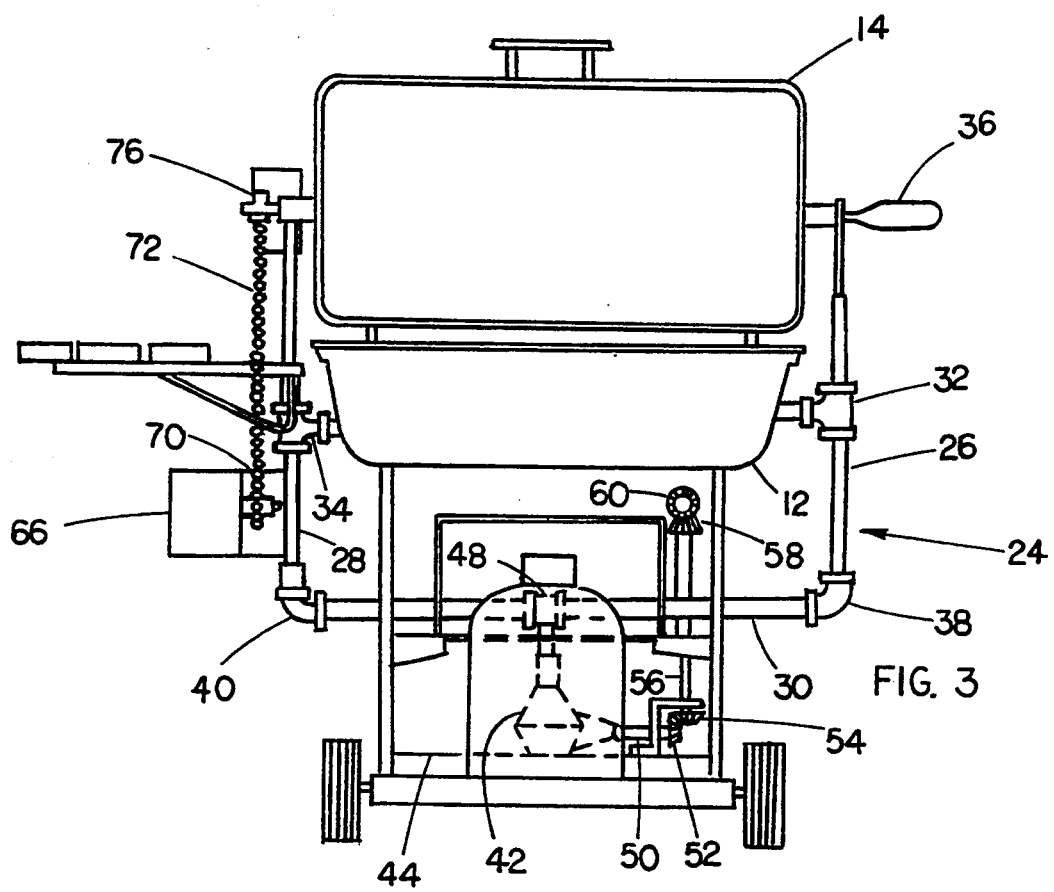
FIG. 3 is a rear elevational view of the apparatus of FIG. 1.
Figure 4:
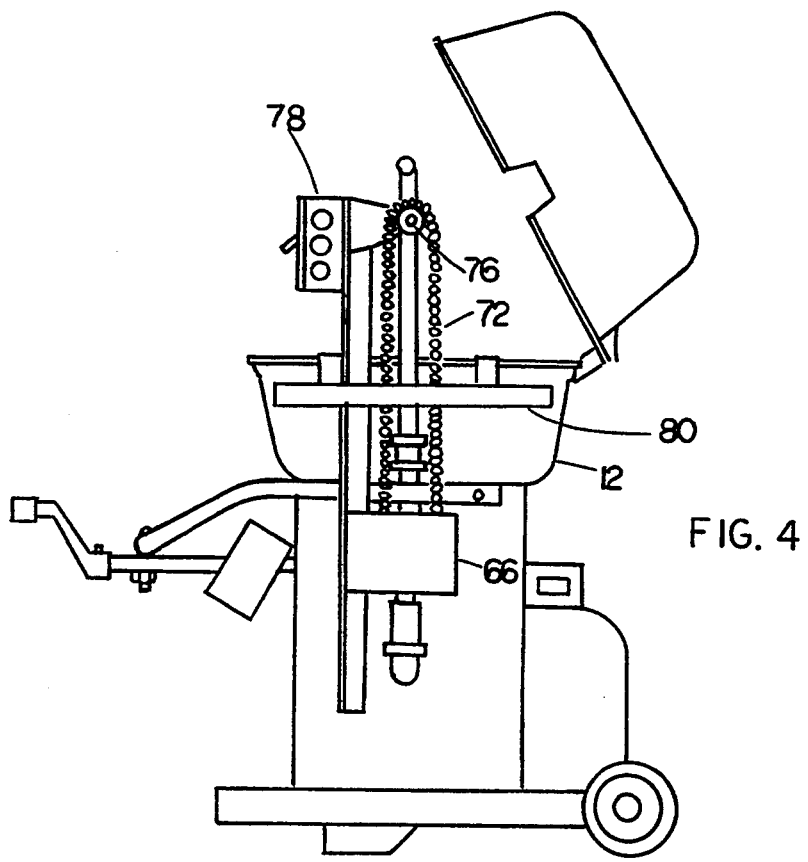
FIG. 4 is a right side elevational view of the apparatus of FIG. 1.

Referring now more particularly to FIGS. 1 through 4, there is provided a portable barbecue grill 10 having a fire bowl 12 and a top 14. Hinges 16 connect the top 14 to the fire bowl 12 so that the top may be readily raised and lowered. Normally the top is kept in the open position when a rotisserie attachment is in use. Rotisserie member 16 is also provided and includes rotatable shaft 18. A pair of prongs 20 and 22 are attached to the rotatable shaft preferably by welding. Prongs 20 and 22 are used to hold the food above the fire bowl 12. Fire bowl 12 is adapted to hold a heat source such as charcoal or gas burners.

The assembly further includes a frame 24 including a pair of vertical bars 26 and 28 and a horizontal bar 30. Guide members 32 and 34 in the form of open pipe couplings are attached to the sides of fire bowl 12 and slidably receive rods 26 and 28. Rod 26 is connected to retatable shaft 18 near its handle 36 and rod 28 is connected to the other end of rotatable shaft 18. The connection between the two rods 26 and 28 and rotatable shaft 18 is such that the connection will not prevent the rotation of the rod. Preferably, the rotatable shaft rest in U-shaped slots (not shown) at the ends of rods 26 and 28. The other ends of rods 26 and 28 are connected to horizontal rod 30 through pipe couplings 38 and 40.

A jack 42 rest on the lower platform 44 of the barbecue grill 10. Jack 42 is preferably a well-known worm-gear jack which is commercially available. Jack 42 includes output shaft 46 which rest against coupling 48 which is connected to rod 30. Thus jack 42 controls the raising and lowering of frame 24 which in turn controls the raising and lowering of shaft 18 and the food which is located on prongs 20 and 22. The height of the food above fire bowl 12 and the cooking temperature may be precisely controlled.

Jack 42 also includes input shaft 50 which has gear 52 connected thereto. Gear 52 meshes with gear 54 which is connected to shaft 56. Shaft 56 also includes gear 58 which meshes with gear 60 which is received on the back side of the lower cover 62 of the barbecue grill 10.

Handle 64 is connected to gear 60 to enable the user of the grill to readily control the jack 42 and thus the height of the prongs 20 and 22 with respect to the fire bowl 12. The height of the prongs have an infinite number of adjustments because of this gearing arrangement rather than an incremental type of adjustment used in many prior art adjustable rotisseries.

Motor 66 is attached to vertical rod 28 through brackets 68 and 70. Thus the motor will go up and down as the frame 24 is moved up and down by the movement of the jack. A chain belt 72 is attached to shaft 74 extending from the motor 66 and is also attached to pulley 76 which is received on the one end of rotatable shaft 18. Thus motor 66 through this chain/pulley arrangement causes shaft 18 to rotate. The tension on the chain belt remains substantially constant for all elevations of the shaft 18. Since the motor is attached to the movable frame and since the frame is attached to the rotatable shaft 18, the motor may be operated as the frame, and thus the food, is moved upwardly and downwardly without the need to stop the motor and thus stop the rotation and cooking of the food. The cooking is therefor continuous even during height adjustment.

An platform 80 for holding food to be cooked, utensils and the like is attached to guide member 34.

From the foregoing description of the preferred embodiment of the invention, it will be apparent that many modifications may be made therein. It is to be understood that all such modifications are embodied in the accompanying claims which come within the true spirit and scope of this invention.

I claim:

1. An adjustable rotisserie comprising:
    a fire bowl for containing a heat source;
    an elongated rotatable shaft;
    at least one prong attached to said shaft for holding food to be cooked;
    a frame; said frame contacting said shaft;
    at least one guide member attached to said fire bowl;
    a portion of said frame slidably received by said guide member;
    a motor for rotating said shaft; said motor attached to said frame; a mechanism for raising and lowering simultaneously said frame, said shaft and said motor identical distances so that the distance between said shaft and said motor remains constant, whereby said shaft may be raised and lowered with respect to said fire bowl while continuously rotating; said mechanism for raising and lowering including a jack; said mechanism for raising and lowering further includes a plurality of gears.
2. An assembly as set forth in claim 1, wherein said mechanism for raising and lowering further includes a hand crank.
3. An adjustable rotisserie comprising:
    a fire bowl for containing a heat source;
    an elongated rotatable shaft;
    at least one prong attached to said shaft for holding food to be cooked;
    a frame; said frame contacting said shaft;
    a motor for rotating said shaft; said motor attached to said frame; a mechanism for raising and lowering simultaneously said frame, said shaft and said motor identical distances so that the distance between said shaft and said motor remains constant, whereby said shaft may be raised and lowered with respect to said fire bowl while continuously rotating; said frame includes a pair of vertical rods and a horizontal rod connected between said vertical rods;
    at least one guide member attached to said fire bowl;
    at least one of said vertical rods slidably received by said guide member.
4. An assembly as set forth in claim 3, further including a jack; a portion of said jack contacting a portion of said horizontal rod for raising and lowering said frame.
5. An adjustable rotisserie comprising:
    a fire bowl for containing a heat source;
    an elongated rotatable shaft;
    at least one prong attached to said shaft for holding food to be cooked;
    a frame; said frame contacting said shaft;
    at least one guide member attached to said fire bowl;
    a portion of said frame slidably received by said guide member;
    a motor for rotating said shaft; said motor attached to said frame; a mechanism for raising and lowering simultaneously said frame, said shaft and said motor identical distances so that the distance between said shaft and said motor remains constant, whereby said shaft may be raised and lowered with respect to said fire bowl while continuously rotating; said assembly further including a belt attached to said motor and to said shaft.
6. An assembly as set forth in claim 5, wherein the tension of the belt is substantially constant for various elevations of said shaft.
7. An adjustable rotisserie assembly comprising:
    a fire bowl for containing a heat source;
    an elongated rotatable shaft;
    at least one prong attached to said shaft for holding food to be cooked;
    a frame; said frame including a pair of vertical rods and a horizontal rod connected between said vertical rods;
    at least one guide member attached to Said fire bowl;
    at least one of said vertical rods slidably received by said guide member;
    at least one of said vertical rods connected to said rotatable shaft;
    a motor connected to at least one of said vertical rods;
    a mechanism connected to said motor and to said shaft for rotating said shaft;
    a jack contacting said horizontal rod for raising and lowering simultaneously said frame, said shaft and said motor identical distances so that the distance between said shaft and said motor remains constant, whereby said shaft may be raised and lowered with respect to said fire bowl while continuously rotating.

* * * * *